United States Patent
Sowards-Emmerd et al.

(10) Patent No.: US 9,001,963 B2
(45) Date of Patent: Apr. 7, 2015

(54) METHOD AND APPARATUS FOR GENERATING COMPUTED TOMOGRAPHY IMAGES WITH OFFSET DETECTOR GEOMETRIES

(75) Inventors: David Sowards-Emmerd, Sunnyvale, CA (US); Charles Nortmann, Richmond Heights, OH (US); Eberhard Hansis, Hamburg (DE); Michael Grass, Buchholz in der Norheide (DE)

(73) Assignee: Koninklijke Philips N.V., Eindhoven (NL)

( * ) Notice: Subject to any disclaimer, the term of this patent is extended or adjusted under 35 U.S.C. 154(b) by 570 days.

(21) Appl. No.: 13/386,910

(22) PCT Filed: Jul. 6, 2010

(86) PCT No.: PCT/IB2010/053093
§ 371 (c)(1),
(2), (4) Date: Jan. 25, 2012

(87) PCT Pub. No.: WO2011/015957
PCT Pub. Date: Feb. 10, 2011

(65) Prior Publication Data
US 2012/0121062 A1  May 17, 2012

Related U.S. Application Data

(60) Provisional application No. 61/231,702, filed on Aug. 6, 2009.

(51) Int. Cl.
G06T 11/00 (2006.01)

(52) U.S. Cl.
CPC ......... *G06T 11/006* (2013.01); *G06T 2211/432* (2013.01)

(58) Field of Classification Search
CPC ........ A61B 6/03; A61B 6/544; A61B 6/5241; A61B 6/4417; A61B 6/487; A61B 6/5235; A61B 5/055; A61B 6/4429; G06T 2211/432
USPC .................................................. 378/4, 11, 63
See application file for complete search history.

(56) References Cited

U.S. PATENT DOCUMENTS 5,319,693 A * 6/1994 Eberhard et al. ................ 378/19
5,778,045 A * 7/1998 von Stetten et al. ......... 378/98.9
(Continued)

FOREIGN PATENT DOCUMENTS

DE  102006041033 A1  3/2008
EP  1852822 A2  11/2007
(Continued)

OTHER PUBLICATIONS

Shao, Philips SPECT/CT Systems, presented Jun. 14, 2008, SNM08 Categorical Seminar—Quantitative SPECT and PET for Molecular Imaging, 23 pages.*
(Continued)

*Primary Examiner* — David J Makiya
*Assistant Examiner* — John Corbett

(57) ABSTRACT

In accordance with one aspect of the invention a method and apparatus for generating complete scout scans with CT imaging devices having offset detector geometries is provided. In accordance with another aspect of the invention, a method and apparatus for increasing the reconstructable field of view for CT imaging devices having offset detector geometries is provided. In accordance with another aspect of the invention, a method and apparatus for image reconstruction for region of interest and full-body imaging with CT imaging devices having offset detector geometries is provided. In accordance with another aspect of the invention, a combined x-ray and SPECT imaging system is provided.

33 Claims, 12 Drawing Sheets

(56) References Cited

U.S. PATENT DOCUMENTS

| | | |
|---|---|---|
| 6,754,519 B1 | 6/2004 | Hefetz et al. |
| 7,062,006 B1 | 6/2006 | Pelc et al. |
| 7,075,087 B2 | 7/2006 | Wang et al. |
| 7,087,903 B2 | 8/2006 | Balan et al. |
| 7,339,174 B1 | 3/2008 | Hugg et al. |
| 7,711,083 B2 | 5/2010 | Heigl et al. |
| 2004/0217292 A1 | 11/2004 | Moyers et al. |
| 2004/0264628 A1 | 12/2004 | Besson |
| 2005/0265523 A1 | 12/2005 | Strobel |
| 2006/0093083 A1 | 5/2006 | Nishide et al. |
| 2008/0009717 A1 | 1/2008 | Herrmann et al. |
| 2008/0089468 A1* | 4/2008 | Heigl et al. ............ 378/20 |
| 2008/0237473 A1 | 10/2008 | Uribe et al. |
| 2009/0016488 A1 | 1/2009 | Klingenbeck-Regn |
| 2009/0161816 A1 | 6/2009 | De Man et al. |

FOREIGN PATENT DOCUMENTS

| | | |
|---|---|---|
| JP | 2002263094 A * | 9/2002 |
| WO | 2007020318 A2 | 2/2007 |
| WO | WO 2007119124 A1 * | 10/2007 |
| WO | 2008021671 A2 | 2/2008 |
| WO | 2009060344 A2 | 5/2009 |
| WO | 2009063353 A2 | 5/2009 |

OTHER PUBLICATIONS

PTO 14/5279 is an English translation of Takemoto et al. (JP 2002-263094A).*

Cho, P. S., et al.; Cone-Beam CT from Width-Truncated Projections; 1996; Computerized Medical Imaging and Graphics; 20(1)49-57.

Grass, M., et al.; Angular weighted hybrid cone-beam CT reconstruction for circular trajectories; 2001; Phys. Med. Biol.; 46:1595-1610.

Hansis, E., et al.; Motion-Compensated Iterative Sparse Data Reconstruction for Interventional 3-D Coronary Artery Imaging; 2008; IEEE Trans. on Nuclear Science Symposium Conf.; M06-407;pp. 4280-4284.

Ning, R., et al.; Flat panel detector-based cone beam computed tomography with a circle-plus-two-arcs data acquisition orbit: preliminary phantom study; 2003; Med. Phys.; 30(7)abstract.

Yu, L., et al.; Region of Interest Reconstruction From Trucated Data in Circular Cone-Beam CT; 2006; IEEE Trans. on Medical Imaging; 25(7)869-881.

* cited by examiner

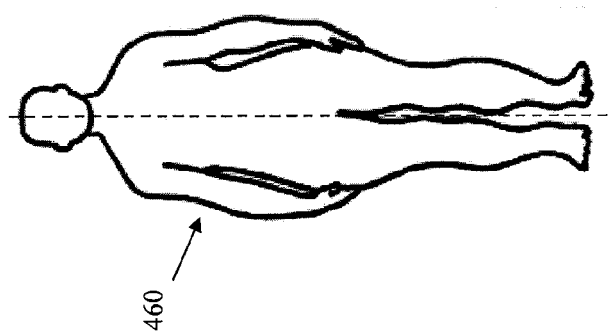
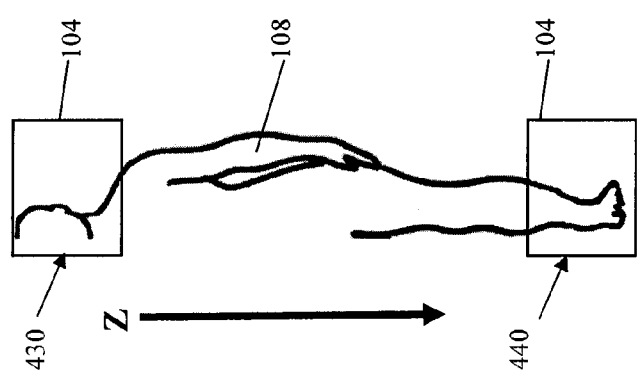
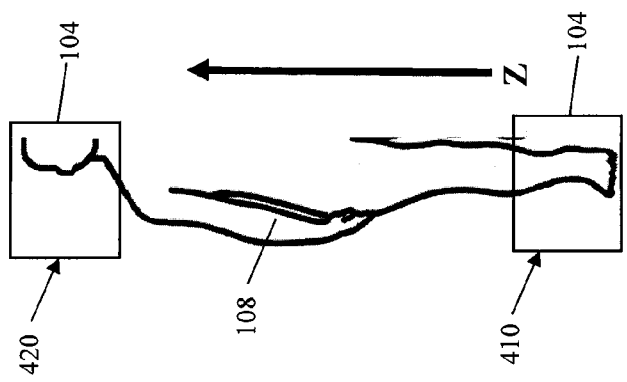

METHOD AND APPARATUS FOR GENERATING COMPUTED TOMOGRAPHY IMAGES WITH OFFSET DETECTOR GEOMETRIES

The present application relates generally to the medical imaging arts. More specifically, it provides methods and apparatuses for generating computed tomography (CT) scout scan images, and the reconstruction of CT images and combined x-ray and single-photon emission computed tomography (SPECT) imaging. The application subject matter finds use at least with CT imaging and other x-ray based imaging, and combined x-ray and SPECT imaging, and will be described with particular reference thereto. However, it also has more general application with other imaging methods and in other arts, such as positron emission tomography (PET).

A conventional CT imaging device includes an x-ray source and an x-ray sensitive detector disposed on opposite sides of an examination region. A human patient or other object to be examined is supported in the examination region by a suitable support. The source emits x-ray radiation which traverses the examination region and is detected by the detector as the source and detector rotate about a center of rotation. A CT imaging device capable of having an offset detector geometry includes an x-ray source and an x-ray sensitive detector that may be transversely displaced from the center of rotation in the transaxial plane in certain configurations. Such offset detector geometry CT imaging devices can be desirable because they allow for an increased field of view or allow for the use of a smaller sized and therefore less expensive detector.

CT imaging devices with offset geometry capabilities may be adapted to allow a user to select the distance the source and/or detector are offset from the center of rotation from a range of available offset distances. In this manner, the offset of the x-ray source and/or detector may be altered or adjusted to accommodate a particular patient or medical imaging procedure. In addition, offset geometry CT imaging devices may provide for the adjustment of the offset during or between medical imaging procedures. For example, the offset of the source or the detector may be altered continuously during an imaging procedure. Also, in accordance with such devices, a particular medical imaging procedure (or a portion of a medical imaging procedure) could be performed in an initial offset position. Subsequent medical imaging procedures (or portions of medical imaging procedures) could then be performed in a different offset position.

It is desirable to provide a method and apparatus for generating complete scout scans with CT imaging devices with offset detector geometries. In addition, it is desirable to provide a method and apparatus for increasing the reconstructable field of view for CT imaging devices with offset detector geometries. It is also desirable to provide a method and apparatus for region of interest and full-body imaging with CT imaging devices with offset detector geometries. Also it is desirable to provide an imaging system for combined x-ray and SPECT imaging.

Aspects of the present invention address these matters, and others. According to one aspect of the present invention, a method and apparatus are provided for generating a complete scout scan image of an imaged object with CT imaging devices having offset detector geometries.

According to another aspect of the present invention, a method and apparatus are provided for increasing the reconstructable field of view of CT imaging devices having offset detector geometries by generating a combined dataset from at least a pair of data acquisitions having different detector offsets.

According to another aspect of the present invention, a method and apparatus are provided for reconstructing an image of an area of interest with CT imaging devices having offset detector geometries by continuously altering the detector offset during a scan acquisition (e.g., a 180 degree acquisition). According to another aspect of the present invention, a method and apparatus are provided for reconstructing a full-body image of an imaged object with CT imaging devices having offset detector geometries by generating a combined dataset from at least a pair of short scan data acquisitions with different detector offsets.

According to another aspect of the present invention, an apparatus for combined x-ray and SPECT imaging is provided comprising an x-ray source, an x-ray detector and two SPECT gamma cameras on a common rotating gantry. According to another aspect of the present invention, an apparatus for combined x-ray and SPECT imaging is provided comprising an x-ray source, an x-ray detector and two SPECT gamma cameras on a first gimbal frame that is attached rotatably to a second gimbal frame.

Still further aspects of the present invention will be appreciated by those of ordinary skill in the art upon reading and understanding the following detailed description. Numerous additional advantages and benefits will become apparent to those of ordinary skill in the art upon reading the following detailed description of preferred embodiments.

The invention may take form in various components and arrangements of components, and in various process operations and arrangements of process operations. The drawings are only for the purpose of illustrating preferred embodiments and are not to be construed as limiting the invention.

FIG. 4A is a schematic view of a first pass over an imaged object with the detector in a first offset position;

FIG. 4B is a schematic view of a second pass over an imaged object with the detector in a second offset position;

FIG. 4C is a schematic view of a complete scout scan image generated by combining the scout scan images from the first and second pass;

Figure 1:
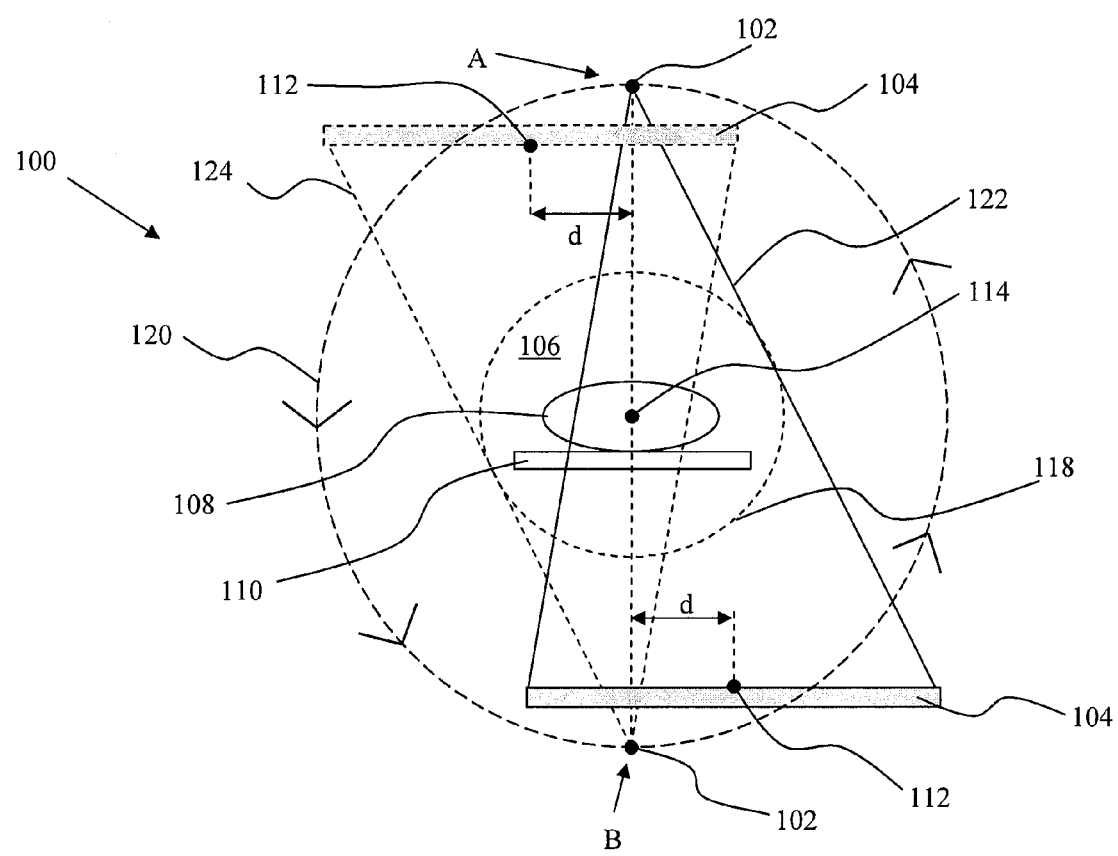
FIG. 1 is a transaxial view of an offset detector CT acquisition geometry according to an embodiment of the invention, with the source and detector illustrated in two opposite positions.

FIG. 1 depicts a transaxial view of an exemplary offset detector geometry 100 for an imaging apparatus in accordance with an embodiment of the invention. The offset detector geometry 100 has an x-ray source 102, such as an x-ray tube, and an x-ray sensitive detector 104, such as a flat panel area detector array extending in the transverse and axial directions. An object support 110 supports the object 108 under examination in an examination region 106. The detector center 112 of the detector 104 of the exemplary offset detector geometry 100 is transversely displaced or offset from the center of rotation 114 in the transaxial plane by a distance "d".

The x-ray source 102 and the x-ray sensitive detector 104 rotate about the center of rotation 114 during certain imaging procedures. The source 102 and detector 104 are generally mounted to a rotating gantry (not shown) for rotation about the examination region 106. An exemplary acquisition trajectory 120 of the source 102 is illustrated by a dashed circle in FIG. 1. In some embodiments, however, the source 102 and detector 104 may remain at a constant angular position while the object 108 is moved and/or rotated to produce the requisite angular sampling. During other imaging procedures, the source 102 and detector 104 may pass over the imaged object 108 in the longitudinal direction.

As illustrated in FIG. 1, the exemplary offset detector geometry 100 has a transverse field of view ("FOV") 118. In FIG. 1, the x-ray source 102 and detector 104 of the exemplary offset detector geometry 100 are depicted in two opposite positions in the transaxial plane, position A in solid lines and position B in dotted lines. In source position A as illustrated, the source 102 is disposed above the object 108 and the detector 104 is disposed below the object 108. In source position B, the x-ray source 102 and detector 104 are rotated 180 degrees about the center of rotation 114 from position A, so the source is disposed below the object 108. As illustrated in FIG. 1, the detector center 112 is offset from the center of rotation 114 in the transaxial plane by a distance "d" in both positions. Also as illustrated in FIG. 1, the source 102 generates a cone 122 of radiation in source position A and an overlapping cone 124 of radiation in source position B.

The amount of overlap between the cones 122 and 124 may be varied by varying the distance "d" between the detector center 112 and the center of rotation 114. Decreasing the distance "d" increases the size of the transverse FOV 118. Conversely, increasing the distance "d" decreases the size of the transverse FOV 118.

The x-ray source 102 and/or detector 104 may be offset from the center of rotation 114 in the transaxial plane by various distances "d" in different embodiments of the present invention. In this manner, the offset of the x-ray source 102 and/or detector 104 may be altered or adjusted to accommodate a particular patient or medical imaging procedure. In some embodiments of the present invention, the offset of the x-ray source 102 and/or detector 104 may be adjusted during or between medical imaging procedures. For example, the offset of the source 102 and/or detector 104 may be altered continuously during an imaging procedure. Also, a particular medical imaging procedure (or a portion of a medical imaging procedure) may be performed with a the source 102 and/or detector 104 with an initial offset. Subsequent medical imaging procedures (or portions of medical imaging procedures) could then be performed with a different offset distance.

The detector 104 may be shifted to vary the size of the transverse FOV 118 by any suitable means. For example, the detector 104 may be moved in various directions relative to the rotating gantry and the center of rotation 114 either manually by a human user or by a mechanical drive. It can be shifted linearly, as is useful with a flat panel detector, or rotationally, as is useful for a curved detector. While the exemplary offset detector geometry 100 described includes a centered source and an offset detector, it should be understood that additional CT imaging device geometries, which include an offset source or an offset source and an offset detector are contemplated.

While the figures and the description are focused on the use of flat panel detectors, arcuate detectors or detectors having yet other shapes may also be used. Furthermore, while the figures and the description focus on a CT system in which the source 102 is a point source, other alternatives are contemplated. For example, the source 102 may be a line source. Gamma and other radiation sources may also be used. Multiple sources 102 and detectors 104 may also be provided, in which case corresponding sets of sources and detectors may be offset angularly and/or longitudinally from one another.

Figure 2:
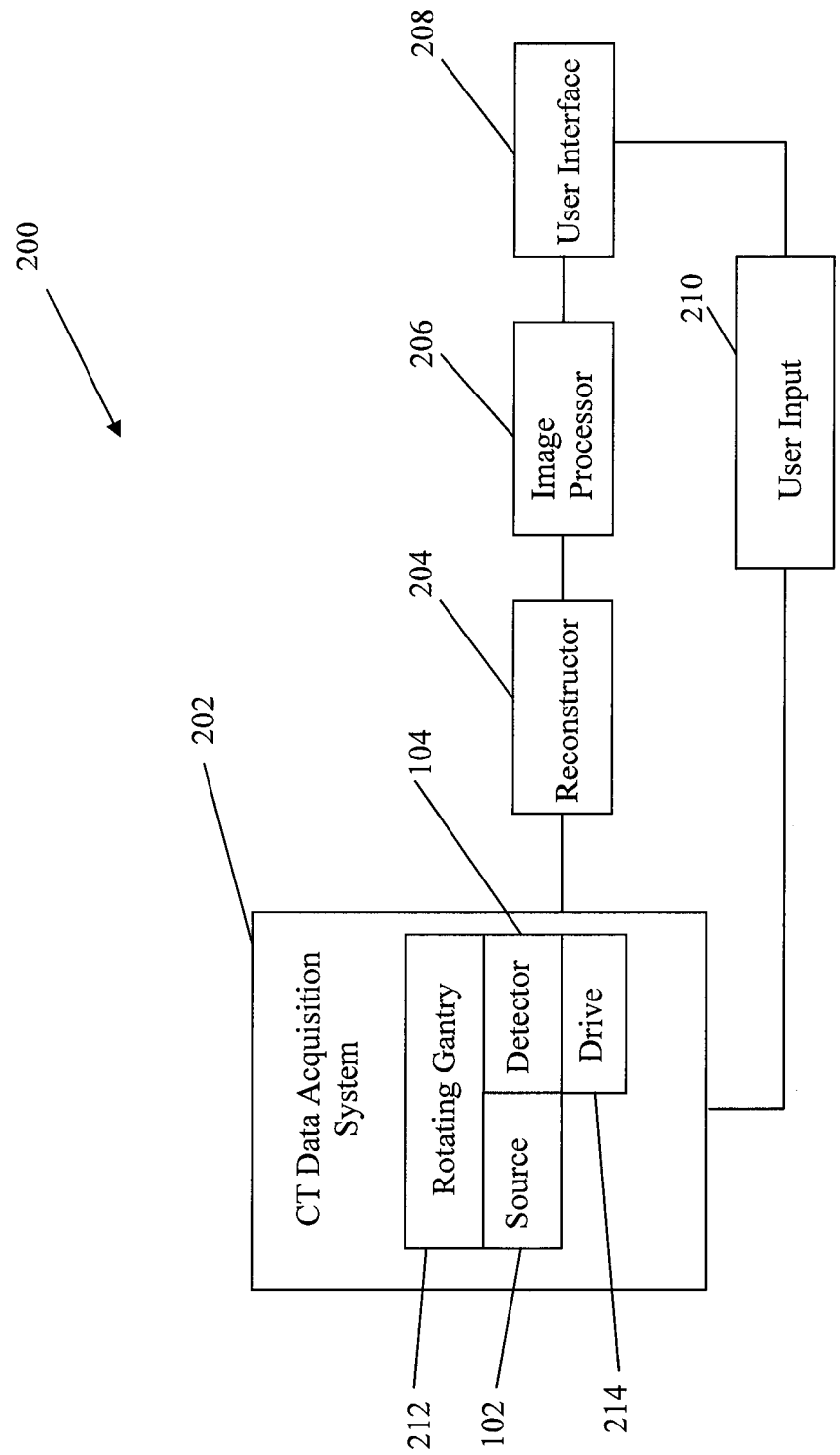
FIG. 2 is an imaging system according to an embodiment of the invention.

FIG. 2 depicts a CT imaging system 200 suitable for use with the exemplary offset detector geometry 100 described above. The CT imaging system 200 includes a CT data acquisition system 202, a reconstructor 204, an image processor 206, a user interface 208, and a user input 210. The CT data acquisition system 202 includes the source 102 and detector 104, which are mounted to a rotating gantry 212 for rotation about the examination region. Circular or other angular sampling ranges as well as axial, helical, circle and line, saddle, or other desired scanning trajectories are contemplated. The embodiment of the CT imaging device system 200 illustrated in FIG. 2 includes a drive 214, such as a microstep motor, that provides the requisite force required to move the source 102 and/or detector 104.

The reconstructor 204 reconstructs the data generated by the data acquisition system 202 using reconstruction techniques to generate volumetric data indicative of the imaged object. The image processor 206 processes the volumetric data as required, for example for display in a desired fashion on the user interface 208, which may include one or more output devices such as a monitor and printer.

The user interface 208, which is advantageously implemented using software instructions executed by a general purpose or other computer so as to provide a graphical user interface ("GUI"), allows the user to control or otherwise interact with the imaging system 200, for example by selecting a desired FOV configuration or dimension, initiating and/or terminating scans, selecting desired scan or reconstruction protocols, manipulating the volumetric data, and the like.

A user input 210 operatively connected to the user interface 208 controls the operation of the CT data acquisition system 202, for example to carry out a desired scanning protocol, optionally position the detector 104 and/or the source 102 so as to provide the desired FOV, and the like.

I. Generation of Scout Scan Image

One aspect of the present invention is directed generally to a method and apparatus for generating a full scout CT image with CT imaging devices having offset detector geometries. Scout CT images may be used as an aid to planning CT imaging procedures, as a diagnostic tool or for other uses. CT imaging devices with offset geometries can be an impediment to the generation of scout CT images in the typical fashion. The offset geometries of such CT devices only permit coverage of a portion of the imaged object in a single projection.

Figure 3:
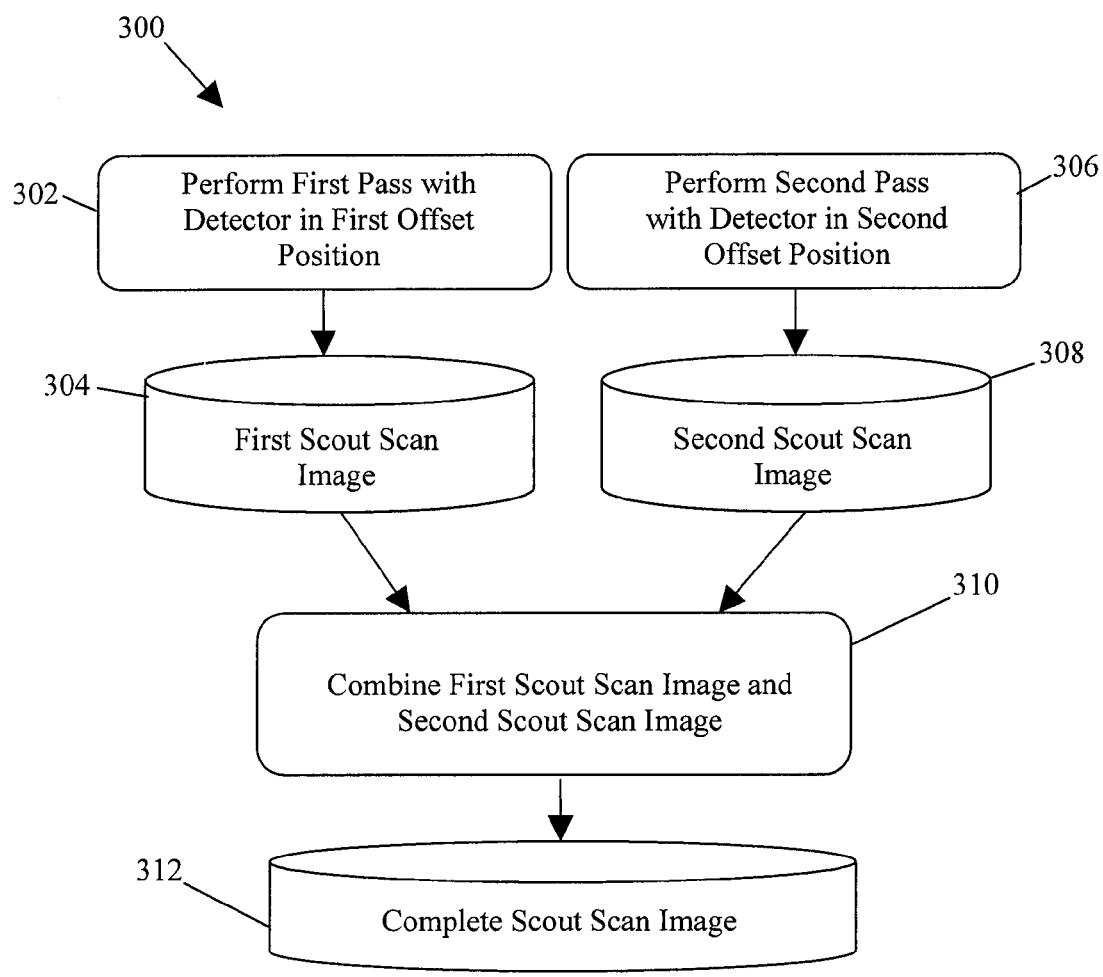
FIG. 3 depicts an exemplary method for acquiring a scout scan image according to an embodiment of the invention.

An exemplary scout scan image generation method 300 according to one aspect of the present invention is illustrated in FIG. 3. The exemplary method 300 generates a scout scan image using projection data obtained from CT imaging devices with an offset detector geometry. Referring again to FIG. 1, the exemplary offset geometry 100 includes a cone-beam x-ray source 102 and an x-ray sensitive detector 104. An object support 110 supports the object 108 under examination in an examination region 106. The detector center 112 of the detector 104 of the exemplary offset detector geometry 100 is offset from the center of rotation 114. The detector 104 may be offset from the center of rotation 114 in the transaxial plane by various distances "d".

In step 302, the CT imaging system 200 is utilized to make a first pass over an imaged object 108 with the detector 104 in a first offset position. In performing this pass over the imaged object 108, the x-ray source 102 and the detector 104 do not rotate around the imaged object 108. Rather, as illustrated in FIG. 4A, the detector 104 and source 102 (not shown) pass by the imaged object 108 in a longitudinal direction Z from position 410 to position 420. During the pass over the imaged object 108, position information regarding the location of the detector 104 relative to the imaged object 108 is maintained. For example, the position of the object support 110 may be used as a proxy for the position of the object 108 on the support 110.

While the detector 104 is shown as moving relative to the imaged object 108 in FIG. 4A, the imaged object 108 may be moved relative to the x-ray source 102 and detector 104 in additional embodiments. In various embodiments of the invention, the detector 104 passes from the anterior end to the posterior end of the imaged object 108. In other embodiments, however, the detector 104 passes from the posterior end to the anterior end of the imaged object 108. In additional embodiments, the detector 104 may pass over the imaged object in a lateral direction.

As shown in FIG. 4A, the detector 104 is set at an offset during the first pass of step 302 so that it generally covers at least half of the width of the imaged object 108. The detector 104 may be set at various offset distances during the first pass of step 302 in additional embodiments. The first pass of step 302 generates a first scout scan image 304 for at least half of the imaged object 108.

In step 306, the CT imaging system 200 is utilized to make a second pass over the imaged object 108 with the detector 104 in a second offset position. For the second pass of step 306, the detector 104 is shifted to the other side of the imaged object 108 as compared to the position of the detector 104 for the first scan of step 302. This can be accomplished by either laterally shifting the detector 104 relative to the imaged object 108 or by rotating the detector 104 in a plane parallel to the object support 110 and imaged object 108 by 180 degrees. As illustrated in FIG. 4B, the detector 104 and source 102 (not shown) pass by the imaged object 108 in a longitudinal direction Z from position 430 to position 440.

As shown in FIG. 4B, the detector 104 is set at an offset during the second pass of step 306 so that it generally covers the half of the width of the imaged object 108 that was not covered by the first pass of 302, as well as an overlap region. The detector 104 may be set at various offset distances during the second pass of step 306 in additional embodiments. The second pass of step 306 generates a second scout scan image 308 for at least half of the imaged object 108. In additional embodiments of the present invention, more than two passes may be conducted with the detector 104 in distinct offset positions during each such pass.

In step 310, the first scout scan image 304 and the second scout scan image 308 are combined to generate a final scout scan image 312 of the imaged object 108. FIG. 4C illustrates an exemplary full scout scan image 460. The first scout scan image 304 and the second scout scan image 308 may be combined using any one or more of several different methods in various embodiments. For example, the scout scan images 304, 308 may be displayed side-by-side. In additional embodiments, alternative lines of acquisition from each of the scout scan images 304 or 308 may be interlaced to generate the final scout scan image 312. In yet additional embodiments, an averaging of the overlapping values of the scout scan images 304 or 308 could be calculated and displayed as final scout scan image 312. In various embodiments of the present invention, one of the scout scan images 304, 308 may be flipped horizontally or vertically prior to combining the scout scan images 304, 308 to generate a final scout scan image 312. In various embodiments of the present invention, collimation may be applied to the x-ray source 102 such that a thin fan of radiation is projected onto the detector 104. Distortion of the projections along the width of the imaged object 108 is compensated by means of a calibration map, or by means of a geometric calculation based upon the distance between the source 102 and detector 104.

As mentioned previously, collimation may be applied to the x-ray source 102 such that a thin fan of radiation is projected onto the detector 104 in some embodiments. Alternatively, data acquired by the detector 104 may be electronically collimated such that a small (e.g., 1-2 mm) axial profile is added to the scout scan image as the detector 104 passes over the imaged object 108. Alternatively, position information from the detector 104 may be applied during calculation of the scout scan image, with information outside of the desired axial area being discarded.

A plurality of combinations may be realized in the generation of the final scout scan image 312. A full length scout image for the entire width of the imaged object 108 may be obtained by combining data from full-length passes with the detector 104 in the first and second offset positions, as shown for example in FIG. 4C. A full length scout scan image for approximately half of the imaged object 108 may be obtained from the data from one full-length pass with the detector in one offset position. A full width scout scan image for only a portion of the length of the imaged object 108 may be obtained by combining data from partial-length passes with the detector 104 in the first and second offset positions. An approximately half-width scout scan image for only a portion of the length of the imaged object 108 may be obtained from one partial-length pass with the detector 104 in one offset position. One partial-length image may be obtained for each opposing orientation of the detector 104 from the beginning and ending positions of the travel of the detector 104, with the images from each position joined to create a scout scan image. The data obtained from the passes may be combined in a variety of additional ways.

While the present invention is described in connection with CT imaging devices, it also has application with hybrid medical imaging devices such as SPECT/CT or PET/CT devices. Generating a scout scan for planning purposes may be accomplished using either the emission (SPECT, PET) or transmission (CT) modality. The method of generating scout scan images disclosed herein may, for example, obviate the need to use a low resolution (PET or SPECT) image for acquisition planning on hybrid medical imaging systems.

II. Increased Axial Range for CT Imaging Devices with Offset Geometries

The reconstruction volume of a CT imaging system with an offset geometry is limited to the voxels that are "illuminated" by the acquisition cone during an acquisition of a particular imaged object 108. The resulting reconstructable volume is shaped similarly to the region labeled "c" in FIG. 5, as this is the only region that is illuminated by the source 102 during a 360 degree acquisition with a CT imaging system having offset geometry.

One aspect of the present invention is directed generally to an acquisition method and apparatus that allows for image reconstruction in an enlarged field of view along the longitudinal axis of the imaged object 108 compared to the volume that is reconstructable based on a single 360 acquisition with a CT imaging system having an offset geometry. An exemplary image acquisition method 600 according to one aspect of the present invention is illustrated in FIG. 6. The exemplary image acquisition method 600 allows for an increased axial range of reconstructable volume of the imaged object 108 to include regions labeled "c" and "b" in FIG. 5.

Figure 7:
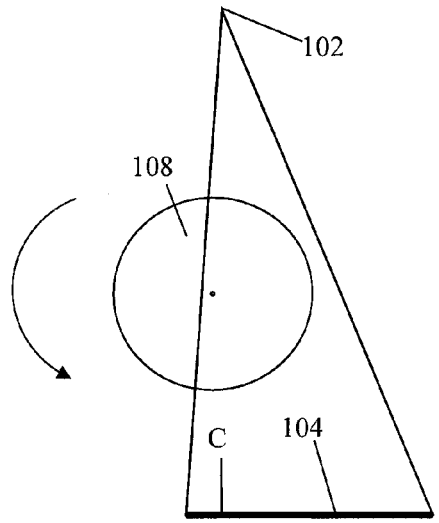
FIG. 7 is a schematic view of a first 360 degree acquisition with the detector in a first offset position.

In step 602, a first acquisition of the imaged object 108 is conducted with the detector 104 in a first offset position. For example, a full 360 degree acquisition may be conducted in step 602. As shown in FIG. 7, during the first acquisition of step 602 the detector 104 is set in position "C" at an offset to one side of the imaged object 108 so that it generally spans approximately half of the width of the imaged object 108. The detector 104 may be set at various offset distances during the first acquisition of step 602 in additional embodiments. While the x-ray source 102 and the detector 104 are shown rotating relative to the imaged object 108 by the arrow in FIG. 7, the imaged object 108 may be rotated relative to the x-ray source 102 and detector 104 in additional embodiments. Even though the x-ray source 102 and the detector 104 are shown rotating counter-clockwise relative to the imaged object 108 in FIG. 7, they may rotate clockwise in additional embodiments.

Figure 8:
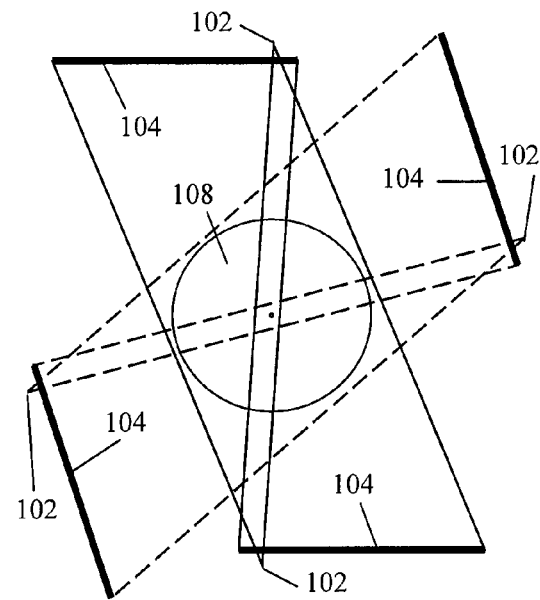
FIG. 8 is a schematic view of the image data acquired during the 360 degree acquisition of FIG. 7.

During the first acquisition of step 602, a first acquisition data set 604 is generated. Opposing images in the data set 604, such as shown for example in FIG. 8, may be combined to cover the entire object 108. However, because each opposing image is truncated and does not cover the entire object by itself, reconstruction relying solely on the data set 604 would be limited to the region labeled "c" in FIG. 5.

Figure 9:
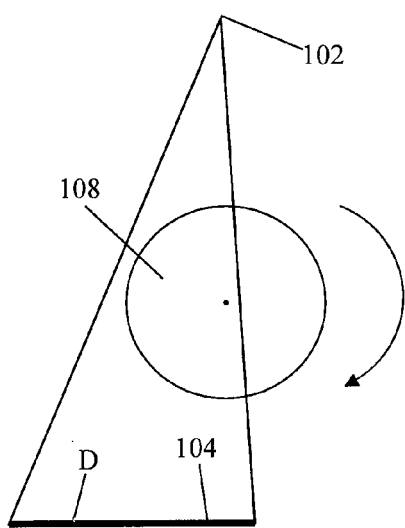
FIG. 9 is a schematic view of a second 360 degree acquisition with the detector in a second offset position on the opposite side of the object as compared to the offset of the detector of the first 360 degree acquisition.

In step 606, a second acquisition of the imaged object 108 is conducted with the detector 104 in a second offset position. For example, a full 360 degree acquisition may be conducted in step 606. As shown in FIG. 9, for the second acquisition of step 606, the detector 104 is shifted to position "D" on the other side of the imaged object 108 as compared to the position "C" of the detector 104 in step 602. The detector 104 may be set at various offset distances during the second acquisition of step 606 in additional embodiments. While the x-ray source 102 and the detector 104 are shown rotating clockwise relative to the imaged object 108 in FIG. 9, they may rotate counter-clockwise in additional embodiments. The x-ray source 102 and detector 104 may rotate in the opposite directions in the acquisitions of step 602 and 606 or they may rotate in the same direction during each respective acquisition. During the second acquisition of step 606, a second acquisition data set 608 is generated.

Figure 10:
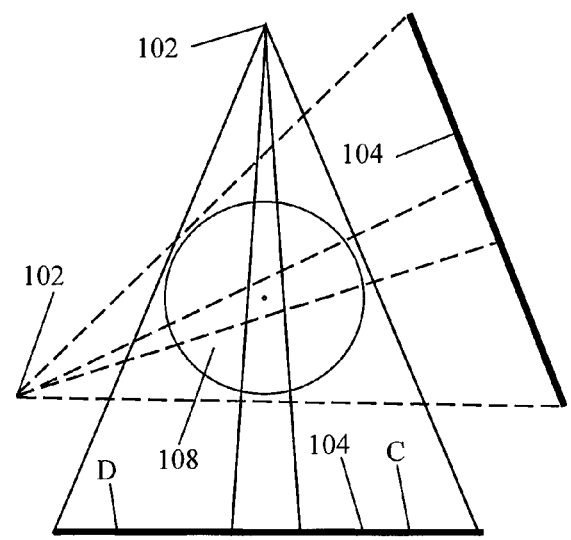
FIG. 10 is a schematic view of the image data acquired during the first 360 degree acquisition and the second 360 degree acquisition.

In step 610, a combined acquisition data set 612 is generated from the combination of the first acquisition data set 604 and the second acquisition data set 608. If two full 360 degree acquisitions are conducted in steps 602 and 604, the combined acquisition data set 612 will be a full non-truncated data set for the full width of the imaged object 108. The combined acquisition data set 612 obtained from the combination of the acquisition with the detector in position "C" and the acquisition with the detector in position "D" is illustrated schematically in FIG. 10 for one projection. In step 614, the combined acquisition data set 612 is reconstructed. The combined acquisition data set 612 can be reconstructed using different reconstruction methods. For example, the combined acquisition data set 612 can be reconstructed using the reconstruction method described in M. Grass et al., *Angular Weighted Hybrid Cone-Beam CT Reconstruction for Circular Trajectories*; Phys. Med. Biol. 46, 1595 (2001), hereby incorporated by reference.

Figure 5:
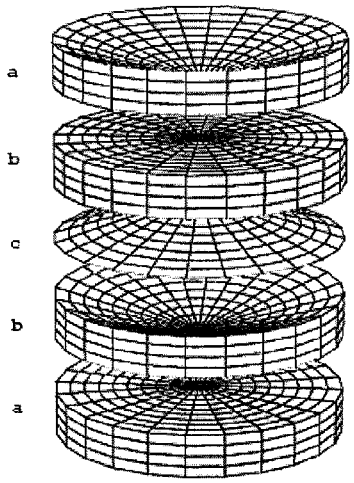
FIG. 5 is a view of reconstruction sub-volumes of cone beam CT imaging using a circular acquisition trajectory.
Figure 6:
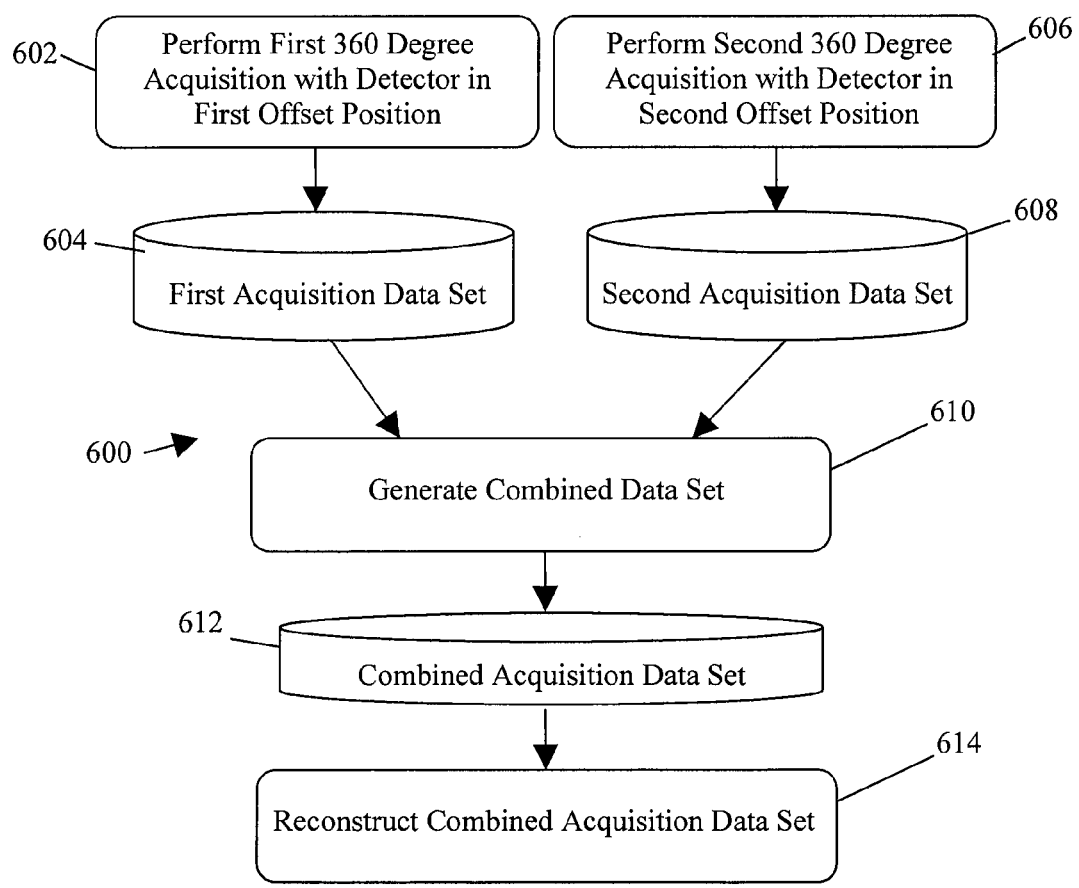
FIG. 6 depicts an exemplary method for increasing the reconstruction volume of a CT imaging device with an offset geometry.

The reconstruction of the combined acquisition data set 612 yields a reconstructable volume in the regions labeled "c" and "b" in FIG. 5. The shape of the field of view of the exemplary acquisition method 600 is generally a cylinder ("c" and "b") compared to the double-conic field of view ("c") of a conventional 360 degree acquisition with a CT imaging device with an offset geometry. The exemplary image acquisition method 600 increases the field of view of acquisitions with a CT imaging device having an offset geometry compared to the previously used single 360 degree acquisition. In addition, standard reconstruction methods can be used to reconstruct the combined acquisition data set 612 instead of the various special reconstruction techniques proposed for the reconstruction of truncated projections. Accordingly, the cone-beam and shading artifacts that result from these special reconstruction techniques for truncated projections are avoided by the exemplary image acquisition method 600.

Figure 11:
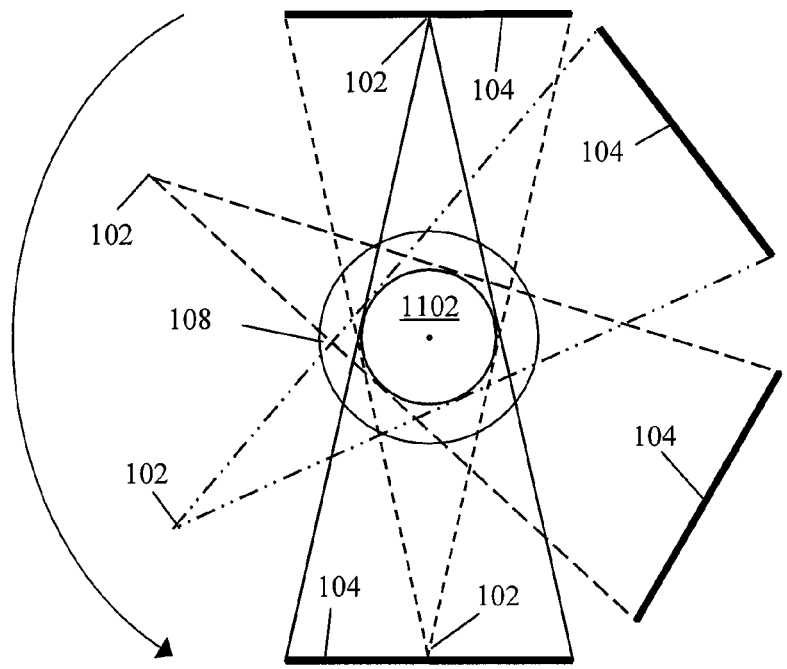
FIG. 11 is a schematic view of the field of view of a conventional CT imaging device with a centered detector that does not span the entire width of the imaged object.

III. Improved Acquisition and Reconstruction Method for CT Imaging Devices having Offset Geometries Conventional CT imaging devices with flat panel detectors offer a large field of view and high spatial resolution. A major drawback of such conventional CT imaging devices, however, is that conventional flat panel detectors often do not span the whole width of a patient's body. If the detector does not span the entire width of a patient, the reconstructable volume 1102 of a centered detector 104 lies within the imaged object 108 as shown in FIG. 11. This "interior reconstruction problem" renders accurate image reconstruction of the entire imaged object 108 impossible without using a larger and therefore more expensive detector.

Figure 12:
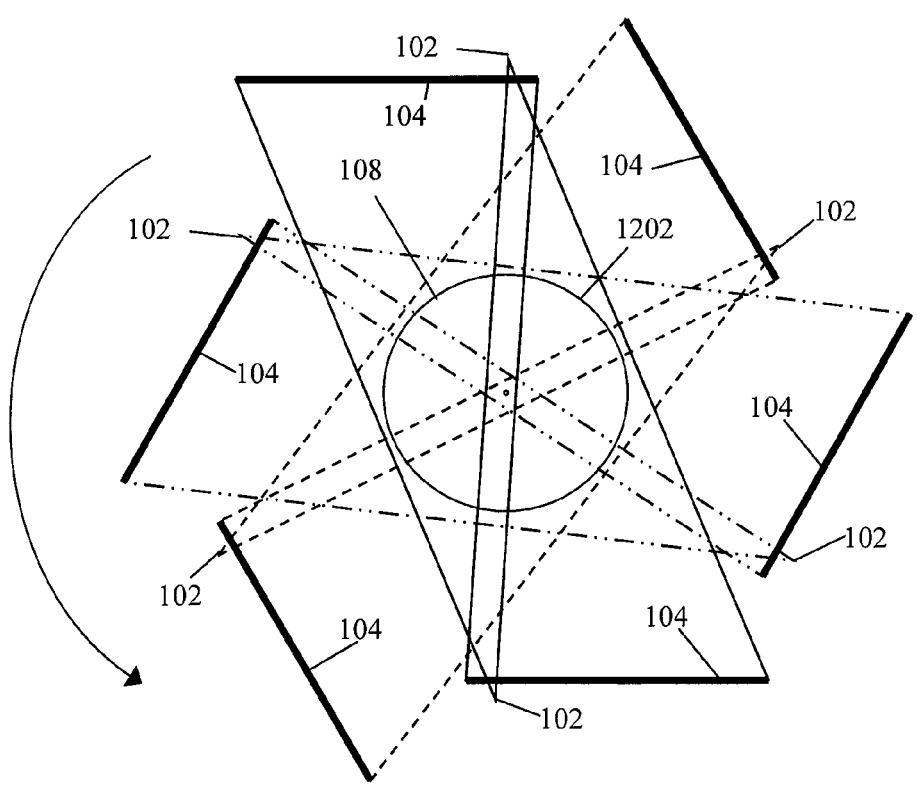
FIG. 12 is a schematic view of the field of view of a CT imaging device with a detector in a laterally shifted offset position.

A CT imaging device with the detector laterally offset to one side can be used to reconstruct an image of an object by conducting a 360 degree acquisition. As shown in FIG. 12, the reconstructable volume 1202 of such a 360 degree acquisition with an offset detector is the full body of the imaged object 108. However, the truncated projections acquired from a 360 degree acquisition with an offset detector require special reconstruction methods. Such special reconstruction techniques often employ redundancy weighting and/or projection completion to cope with the truncation of the projections. Due to the non-idealities of these special reconstruction techniques, strong cone-beam and shading artifacts are often introduced into the reconstructed image.

A. Region of Interest Imaging

One aspect of the present invention is directed generally to an acquisition and reconstruction method and apparatus that allows for the imaging of a region of interest within the imaged object 108 by conducting a single 180 degree acquisition. The proposed acquisition and reconstruction method does not require the use of a special reconstruction method for truncated projections.

Figure 13:
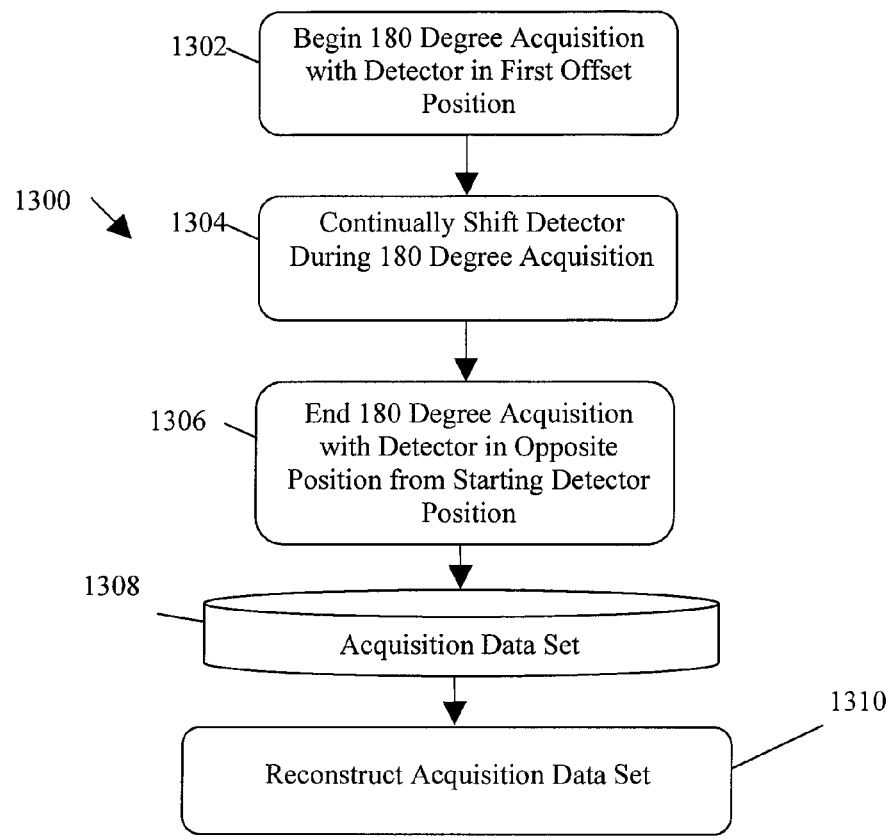
FIG. 13 depicts an exemplary method for reconstructing an image of a region of interest within an imaged object.

An exemplary image acquisition method 1300 according to one aspect of the present invention is illustrated in FIG. 13. The exemplary image acquisition method 1300 allows for imaging of a region of interest within the imaged object 108 without the need for a special reconstruction to deal with truncated projections. In step 1302, a 180 degree acquisition is begun with the detector 104 in a first offset position shifted to one side of the imaged object 108 (shown in FIG. 14 as position "E"). In step 1304, the offset of the detector 104 is continually shifted during the 180 degree acquisition (shown schematically in FIG. 14) while imaging data is recorded. In step 1306, the 180 degree acquisition is completed with the detector 104 shifted to the opposite side of the offset position from the start of the 180 degree acquisition (shown in FIG. 14 as position "F"). An acquisition data set 1308 is generated during the acquisition of steps 1302, 1304 and 1306.

Figure 14:
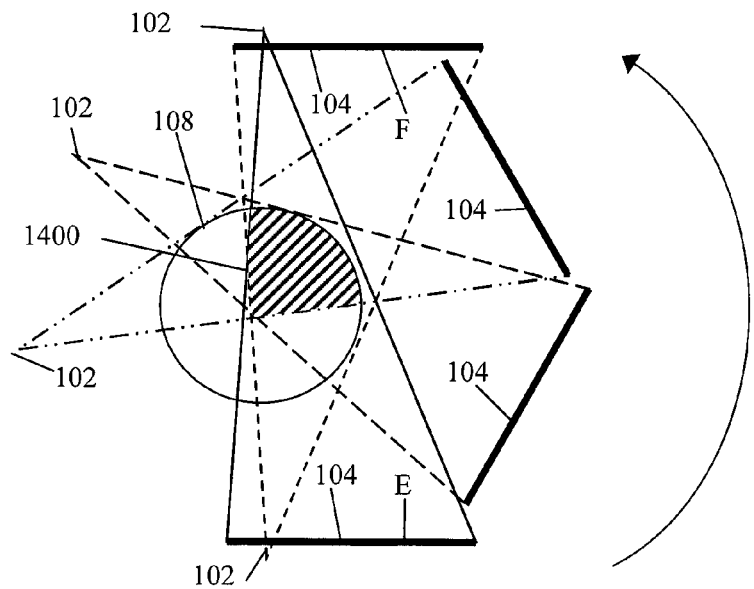
FIG. 14 is a schematic view of image data acquired during the region of interest imaging method of FIG. 13.

In step 1310, the acquisition data set 1308 is reconstructed. In accordance with exemplary image acquisition method 1300, an image can be reconstructed for a region of interest 1400 (as shown in FIG. 14). The image data 1308 acquired by the exemplary image acquisition method 1300 can be reconstructed using a variety of reconstruction methods. For example, the image data may be reconstructed using the reconstruction method described in L. Yu et al., *Region of Interest Reconstruction from Truncated Data in Circular Cone-Beam CT*, ICCC Trans. Med. Imag. 25, 869 (2006), hereby incorporated by reference. The position and location of the region of interest 1400 may be customized or selected by varying the start and end angles of the acquisition scan 1304.

The exemplary image acquisition method 1300 is advantageous, for example, when a full 360 degree acquisition cannot be performed due to mechanical or procedural constraints. Furthermore, the radiation dose of exemplary image acquisition method 1300 is generally half of what is administered to a patient in a full 360 degree acquisition.

B. Whole-Body Imaging

Another aspect of the present invention is directed generally to an acquisition and reconstruction method and apparatus that allows for the imaging of the entire imaged object 108 by conducting two 180 degree acquisitions. The proposed acquisition and reconstruction method does not require the use of a special reconstruction method for truncated projections.

Figure 15:
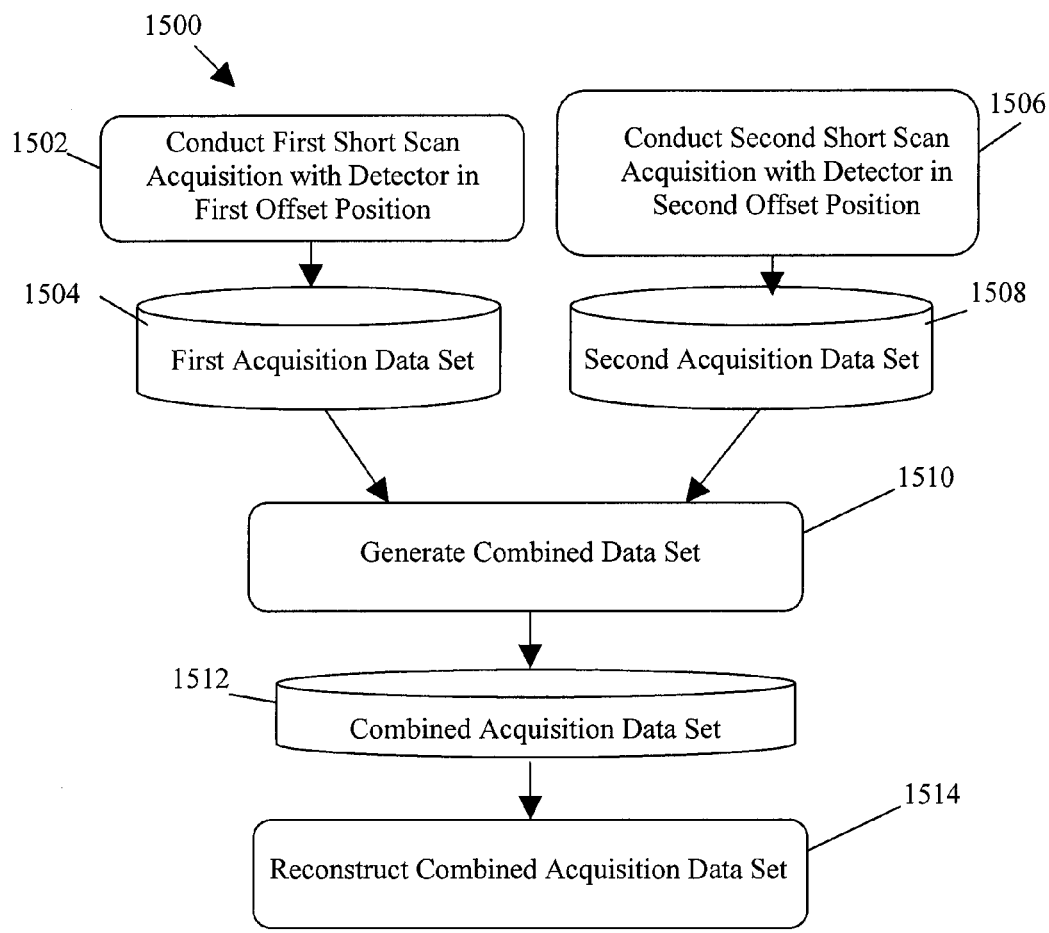
FIG. 15 depicts an exemplary method for reconstructing an image of an entire object based upon the data acquired from a pair of short scan acquisitions.

An exemplary image acquisition and reconstruction method 1500 according to one aspect of the present invention is illustrated in FIG. 15. The exemplary image acquisition method 1500 allows for the reconstruction of an image of a whole imaged object 108 from two short scan acquisitions without the need for special reconstruction algorithms to deal with truncated projections.

Figure 16:
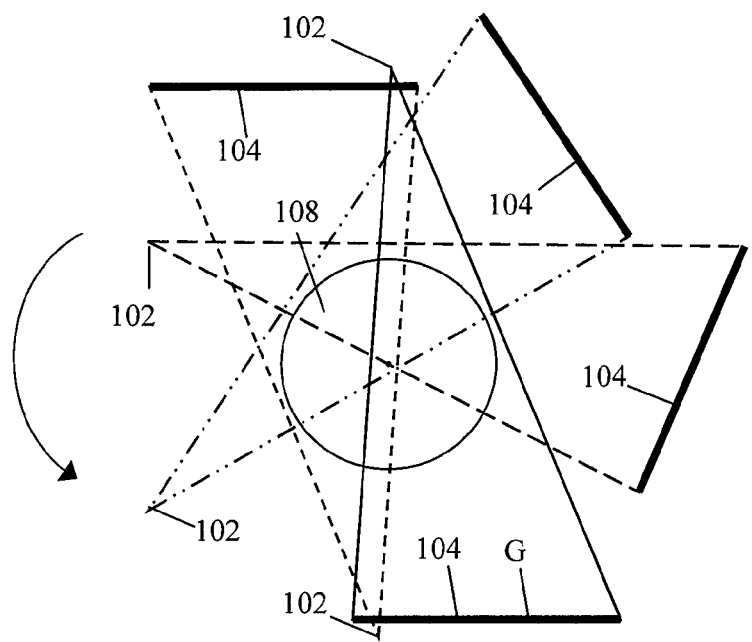
FIG. 16 is a schematic view of a first short scan acquisition with the detector in a first offset position.

In step 1502, a first acquisition of the imaged object 108 is conducted with the detector 104 in a first offset position. For example, a short scan (180 degrees plus fan angle) may be conducted in step 1502. This example is illustrated in FIG. 16. While the x-ray source 102 and the detector 104 are shown rotating relative to the imaged object 108 in FIG. 16, the imaged object 108 may be rotated relative to the x-ray source 102 and detector 104 in additional embodiments. During the first acquisition of step 1502, a first acquisition data set 1504 is generated. The data that is acquired during the exemplary short scan acquisition of step 1502 is shown schematically in FIG. 16.

As shown in FIG. 16, during the first acquisition of step 1502 the detector 104 is set in position "G" at an offset to one side of the imaged object 108 so that it generally spans approximately half of the width of the imaged object 108. The detector 104 may be set at various offset distances during the first acquisition of step 1502 in additional embodiments. While the x-ray source 102 and the detector 104 are shown by the arrow in FIG. 16 to be rotating counter-clockwise relative to the imaged object 108, they may rotate clockwise in additional embodiments.

Figure 17:
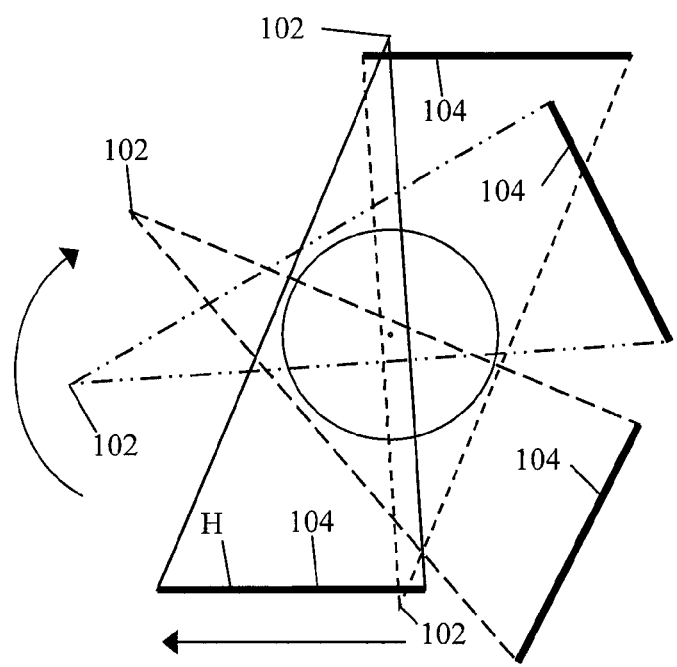
FIG. 17 is a schematic view of a second short scan acquisition with the detector in a second offset position on the opposite side of the object as compared to the offset of the detector of the first short scan acquisition.

In step 1506, a second acquisition of the imaged object 108 is conducted with the detector 104 in a second offset position "H" of FIG. 17. For example, a short scan acquisition (180 degrees plus fan angle) may be conducted in step 1506. As shown by an arrow in FIG. 17, for the second acquisition of step 1506, the detector 104 is shifted to the other side of the imaged object 108 as compared to the position of the detector 104 in step 1502. The detector 104 may be set at various offset distances during the second acquisition of step 1506 in additional embodiments. While the x-ray source 102 and the detector 104 are shown by another arrow in FIG. 17 to be rotating clockwise relative to the imaged object 108, they may rotate counter-clockwise in additional embodiments. In the exemplary method of FIG. 15, the x-ray source 102 and detector 104 rotate in the opposite directions in the respective acquisitions of step 1502 and 1506. During the second acquisition of step 1506, a second acquisition data set 1508 is generated. The data that is acquired during the exemplary short scan acquisition of step 1506 is shown schematically in FIG. 17.

Figure 18:
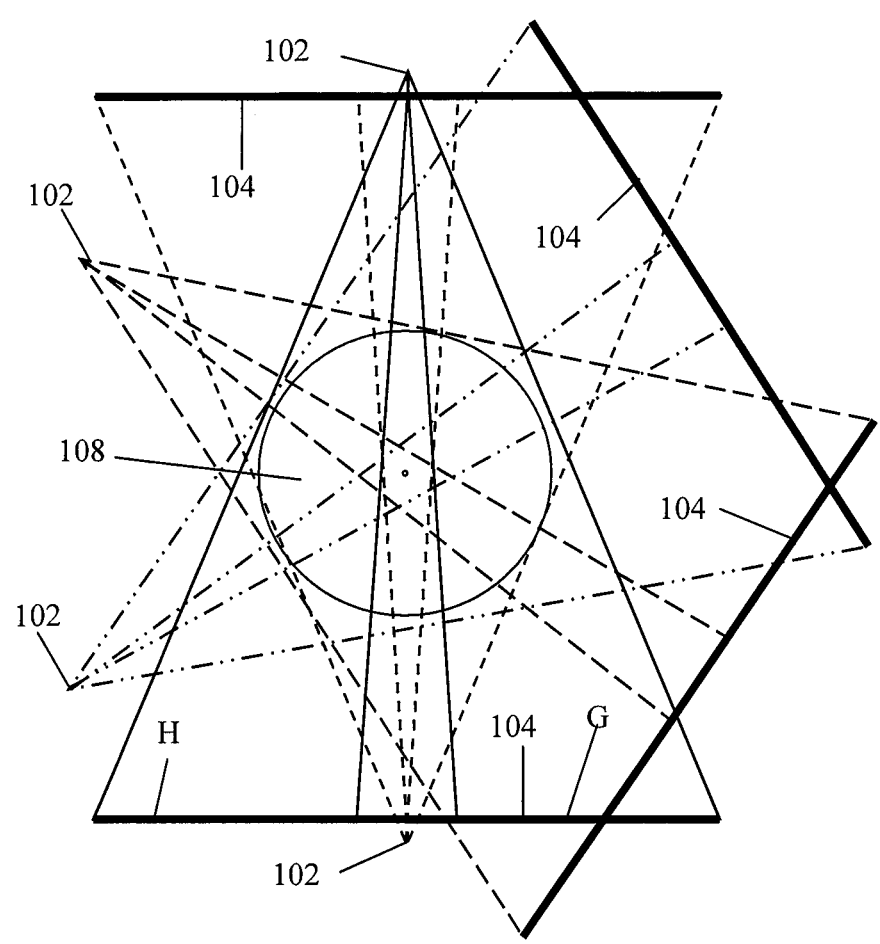
FIG. 18 is a schematic view of the image data acquired during the first short scan acquisition and the second short scan acquisitions of FIGS. 16 and 17.

In step 1510, a combined acquisition data set 1512 is generated from the combination of the first acquisition data set 1504 and the second acquisition data set 1508. The data included in the combined data set 1512 is illustrated schematically in FIG. 18. In step 1514, the combined acquisition data set 1512 is reconstructed. The combined acquisition data set 1512 can be reconstructed using different reconstruction methods. For example, the combined acquisition data set 1512 can be reconstructed using standard reconstruction methods such as FDK reconstruction.

The exemplary image acquisition and reconstruction method 1500 allows for the imaging of the entire imaged object without the need for redundancy weighting and/or projection completion. Accordingly the exemplary method avoids the strong shading and cone-beam artifacts that can result from such methods. The required number of projections in the exemplary method 1500 is only slightly higher than the number required for one 360 degree acquisition with a constant detector offset. Therefore, the radiation dose with the exemplary method 1500 is only slightly higher than that of a conventional 360 degree acquisition with a CT imaging device having an offset geometry.

IV. Combined X-Ray and SPECT Imaging System

It is desirable to provide an imaging system for combined x-ray and SPECT imaging. Such a combined x-ray and SPECT imaging system would have many applications. For example, such a system would be useful with the diagnosis of cardiovascular disease and myocardial perfusion deficits. Currently, the most common imaging modalities for the diagnosis of cardiovascular disease and myocardial perfusion deficits are, respectively, interventional coronary angiography on a C-arm x-ray system and SPECT myocardial perfusion imaging. Coronary angiography accurately images the coronary arteries and enables the detection of stenotic or obstructed vessels.

For a complete and thorough assessment of coronary artery health and myocardial perfusion it is therefore desirable to perform both x-ray coronary angiography and SPECT myocardial perfusion imaging. To date, the two examinations are performed in separate imaging equipment in sequence, one after the other. A subsequent treatment is often carried out in a minimally-invasive catheter-based fashion under x-ray guidance. The usefulness of a combined x-ray and SPECT imaging system are not limited to merely cardiac care, but rather a combined x-ray and SPECT imaging system would have application in many other fields, such as oncology, or in any other applications of SPECT/CT.

One aspect of the present invention is directed generally to a combined x-ray and SPECT imaging system. In accordance with one aspect of the present invention, a combined x-ray and SPECT imaging system is provided that makes it possible to carry out x-ray coronary angiography, SPECT, and subsequent x-ray guided interventions in the same system. In accordance with another aspect of the present invention, a combined x-ray and SPECT imaging system is provided that offers x-ray imaging capabilities similar to a conventional C-arm system, which provides a large range of possible viewing directions and an open design with easy access to the patient.

Figure 19:
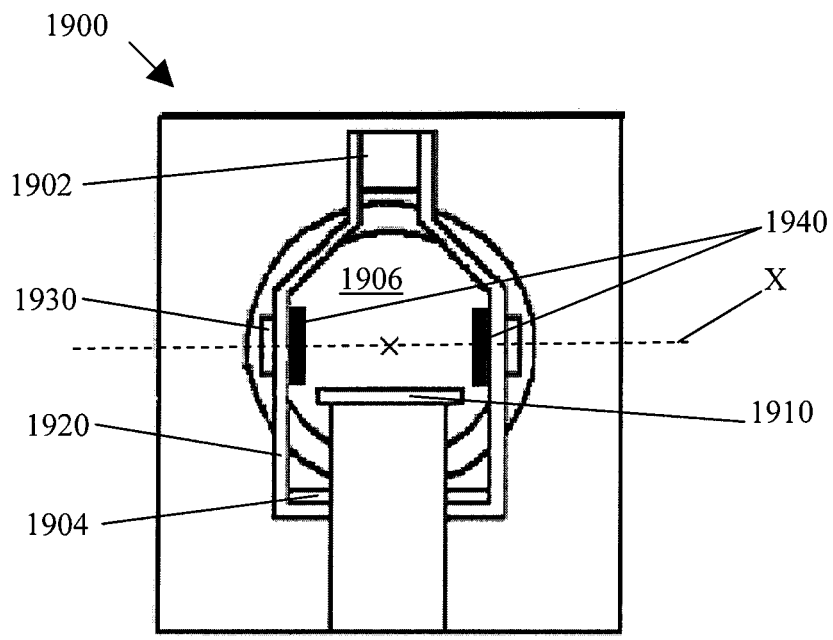
FIG. 19 is a front elevational view of a combined x-ray and SPECT imaging system according to an embodiment of the invention.
Figure 20:
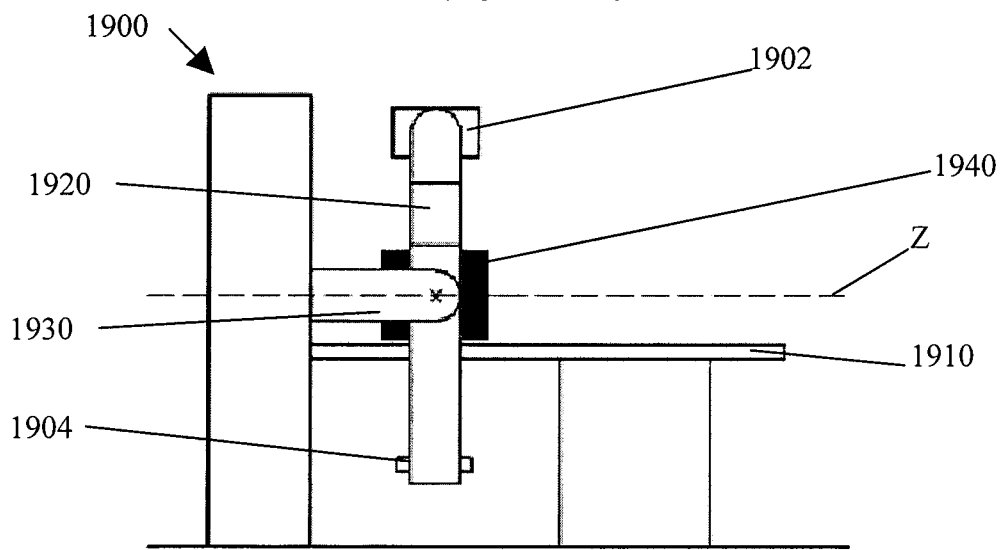
FIG. 20 is a side elevational view of the combined x-ray and SPECT imaging system of FIG. 19.

FIGS. 19 and 20 depict an exemplary combined x-ray and SPECT imaging system 1900 in accordance with an embodiment of the invention. The combined x-ray and SPECT imaging system 1900 includes an x-ray source 1902, such as an x-ray tube, and an x-ray sensitive detector 1904, such as a flat panel area detector array extending in the transverse and axial directions. An object support 1910 is provided for support of the object undergoing an imaging procedure in an examination region 1906.

The source 1902 and detector 1904 are generally mounted to a first gimbal frame 1920 for rotation about the examination region 1906. The first gimbal frame 1920 can be rotated freely around the axis labeled as X in FIG. 19 (i.e., the transverse axis of the patient) (CAUD/CRAN angulation). The first gimbal frame 1920 is attached rotatably to a second gimbal frame 1930. The second gimbal frame 1930 can be rotated freely around the axis labeled as Z in FIG. 20 (i.e., the head-foot axis of the patient) (LAO/RAO angulation).

In the exemplary combined x-ray and SPECT imaging system 1900, two SPECT gamma cameras 1940 are mounted to the first gimbal frame 1920. Rotation of the second gimbal frame 1930 around the Z axis enables rotational SPECT acquisitions. In additional embodiments, one SPECT gamma camera or a variety of numbers of SPECT gamma cameras may be used. In additional embodiments, the source 1902, detector 1904 and/or gamma cameras 1940 may be mounted to the second gimbal frame 1930.

The combination of the rotatable first gimbal frame 1920 and second gimbal frame 1930 increases the range of possible viewing directions of the exemplary combined x-ray and SPECT imaging system 1900. The large range of possible viewing directions, together with the open design provided by the exemplary combined x-ray and SPECT imaging system 1900 has many benefits. For example, the exemplary combined x-ray and SPECT imaging system 1900 makes it possible to perform catheter-based intra-cardiac interventions under x-ray guidance. Moreover, the exemplary combined x-ray and SPECT imaging system 1900 enables rotational SPECT acquisitions and provides for non-planar acquisition trajectories for x-ray imaging.

The SPECT and x-ray data acquired by the exemplary combined x-ray and SPECT imaging system 1900 may be intrinsically co-registered, since this data is acquired without moving the patient. One exemplary use of the combined x-ray and SPECT imaging system 1900 is for the diagnosis and treatment of myocardial perfusion. For example, the exemplary combined x-ray and SPECT imaging system 1900 could be used to combine and display myocardial perfusion data, a 3D reconstruction of the coronary arteries, and additional 2D angiography projections for a physician or other clinician. The physician can then jointly assess vessel lesions and their impact on myocardial perfusion and plan an intervention strategy with higher accuracy and more confidence than is possible with current imaging methods. The acquired image data can further be used to aid roadmapping and navigation guidance for a subsequent x-ray guided intervention. Finally, the system can be used to assess the treatment success in-place, in order to immediately determine the need for additional interventional measures.

In accordance with another embodiment of the invention, a combined x-ray and SPECT imaging system is provided (not shown). In accordance with this exemplary combined x-ray and SPECT imaging system, two SPECT gamma cameras, an x-ray source, and an x-ray flat-panel detector are provided on a common rotating gantry. The x-ray detector is mounted with a lateral offset to increase the imaging field-of-view. The exemplary combined x-ray and SPECT imaging system is adapted such that the lateral detector offset can be varied. Such a setup enables rotational x-ray coronary angiography acquisitions, e.g., the performance of 3D coronary artery imaging. During an intervention, the system can be freely rotated around the patient axis to an optimum viewing direction. According to one embodiment of the present invention, the combined x-ray and SPECT imaging system could be a modified conventional CT imaging system that has been adapted to include one or more SPECT gamma cameras.

The various embodiments of combined x-ray and SPECT imaging systems disclosed herein may be used in connection with a variety of imaging methods. For example, the combined x-ray and SPECT imaging system may be used in connection with the exemplary scout scan image generation method 300; exemplary enlarged field of view image acquisition method 600; exemplary region of interest image acquisition method 1300; and/or exemplary whole body image acquisition method 1500 disclosed herein or other imaging methods. The various embodiments of combined x-ray and SPECT imaging systems disclosed herein provide for a large range of possible viewing directions and an open design with easy access to the patient. The proposed combined x-ray and SPECT imaging systems can greatly improve the diagnosis and treatment of cardiovascular disease. The integrated imaging solution eliminates the need to move the patient from one imaging system to another for diagnosis and treatment. The co-registered acquisition of x-ray and SPECT imaging modalities also provides several benefits. For example, the co-registered acquisition of data from these two imaging modalities enables the joint assessment of coronary artery lesions and myocardial perfusion. The proposed combined x-ray and SPECT imaging system has applicability with cardiovascular imaging, myocardial perfusion assessment, x-ray guided catheter interventions as well as other medical applications and procedures.

The aforementioned functions, such as for example, selecting a desired FOV configuration or dimension, initiating and/or terminating scans, selecting desired scan or reconstruction protocols, manipulating the volumetric data, and the like, can be performed as software logic. "Logic," as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

The systems and methods described herein can be implemented on a variety of platforms including, for example, networked control systems and stand-alone control systems. Additionally, the logic, databases or tables shown and described herein preferably reside in or on a computer readable medium, such as a component of the imaging system 200 like the reconstructor 204 or the image processor 206. Examples of different computer readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk or tape, optically readable mediums including CD-ROM and DVD-ROM, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated, and/or re-organized in their implementation as warranted or desired.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A method of generating an image of an object using an imaging apparatus having a detector, comprising the steps of:
providing a first gimbal frame;
providing a second gimbal frame, wherein the first gimbal frame and second gimbal frame are rotatably connected to one another;
providing an x-ray radiation source mounted to the first gimbal frame;
providing an x-ray radiation detector mounted to the first gimbal frame;
providing at least a pair of SPECT gamma cameras mounted to the first gimbal frame;
gathering a first imaging data regarding the object with the detector offset from a center of rotation in a first offset position;
shifting the detector to a second position which is offset from the center of rotation, wherein the second offset position is different from the first offset position;
gathering a second imaging data regarding the object with the detector in the second offset position; and
using the first imaging data and the second imaging data to reconstruct an image of the object.

2. The method of claim 1, wherein the first offset position spans approximately a first half of the width of the object and the second offset position spans approximately a remaining half of the width of the object that was not spanned by the detector in the first offset position.

3. The method of claim 2, wherein the first imaging data comprises a first scout scan image gathered in a first pass of the detector over the object; wherein the second imaging data comprises a second scout scan image gathered in a second pass of the detector over the object; and further comprising combining together the first scout scan image and the second scout scan image to generate a final scout scan image of the object.

4. The method of claim 3, further comprising generating the final scout scan image of the imaged object based on portions of intersection between the first scout scan image and the second scout scan image.

5. The method of claim 3, further comprising generating the final scout scan image of the imaged object by using alternating lines of acquisition of the first scout scan image and the second scout scan image.

6. The method of claim 3, further comprising generating the final scout scan image of the imaged object by averaging overlapping values of the first scout scan image and the second scout scan image.

7. The method of claim 2, further comprising gathering the first imaging data in a first imaging acquisition that is an approximately 360 degree rotation of the detector; gathering the second imaging data in a second imaging acquisition that is an approximately 360 rotation of the detector, combining the first imaging data with the second imaging data to generate a combined acquisition data set; and reconstructing the combined acquisition data set to generate a reconstructed image of the object.

8. The method of claim 7, wherein the first imaging acquisition and the second imaging acquisition are conducted in opposing rotational directions.

9. The method of claim 2, further comprising gathering the first imaging data in a first imaging acquisition that is a short scan acquisition; gathering the second imaging data in a second imaging acquisition that is a short scan acquisition; combining the first imaging data with the second imaging data to generate a combined acquisition data set; and reconstructing the combined acquisition data set to generate a reconstructed image of the object.

10. The method of claim 1, wherein the detector spans approximately a first half of the width of the object in the first offset position, and further comprising:
   shifting the detector during an imaging acquisition such that the detector is in the second offset position at the conclusion of the imaging acquisition, wherein the second offset position spans generally a remaining half of the width of the object that was not spanned by the detector in the first offset position, and
   gathering third imaging data regarding the object during the imaging acquisition with the detector in a plurality of intermediate positions between the first offset position and the second offset position; and
   reconstructing the first, second and third imaging data to generate a reconstructed image of the object.

11. The method of claim 10, wherein the detector rotates approximately 180 degrees during the imaging acquisition.

12. The method of claim 10, further comprising customizing a location of a region of interest within the object by varying at least one of a start angle and an end angle of the imaging acquisition.

13. The method of claim 10, wherein the detector is continuously shifted during the imaging acquisition.

14. A combined x-ray and SPECT imaging system comprising:
   a first gimbal frame;
   a second gimbal frame, wherein the first gimbal frame and second gimbal frame are rotatably connected to one another;
   an x-ray radiation source mounted to the first gimbal frame;
   an x-ray radiation detector mounted to the first gimbal frame; and
   at least a pair of SPECT gamma cameras mounted to the first gimbal frame.

15. The combined x-ray and SPECT imaging system of claim 14, wherein the first gimbal frame is rotatable about a transverse axis of a patient.

16. The combined x-ray and SPECT imaging system of claim 14, wherein the second gimbal frame is rotatable about a head-foot axis of a patient.

17. The combined x-ray and SPECT imaging system of claim 14, wherein the imaging system is adapted to gather a first imaging data regarding the object with the detector offset from a center of rotation in a first offset position; wherein the imaging system is adapted to shift the detector to a second position which is offset from the center of rotation, wherein the second offset position is different from the first offset position; wherein the imaging system is adapted to gather a second imaging data regarding the object with the detector in the second offset position; and wherein the imaging system is adapted use the first imaging data and the second imaging data to reconstruct an image of the object.

18. The combined x-ray and SPECT imaging system of claim 17, wherein the detector spans approximately a first half of the width of the object in the first offset position; wherein the imaging system is adapted to shift the detector during an imaging acquisition such that the detector is in the second offset position at the conclusion of the imaging acquisition; wherein the second offset position spans generally a remaining half of the width of the object that was not spanned by the detector in the first offset position; wherein the imaging system is adapted to gather third imaging data regarding the object during the imaging acquisition with the detector in a plurality of intermediate positions between the first offset position and the second offset position; and wherein the imaging system is adapted to reconstruct the first, second and third imaging data to generate a reconstructed image of the object.

19. The combined x-ray and SPECT imaging system of claim 18, wherein the detector rotates approximately 180 degrees during the imaging acquisition.

20. The combined x-ray and SPECT imaging system of claim 17, wherein the first offset position spans approximately a first half of the width of the object and the second offset position spans approximately a remaining half of the width of the object that was not spanned by the detector in the first offset position.

21. The combined x-ray and SPECT imaging system of claim 20, wherein the first imaging data comprises a first scout scan image gathered in a first pass of the detector over the object; wherein the second imaging data comprises a second scout scan image gathered in a second pass of the detector over the object; and wherein the imaging system is adapted to combine together the first scout scan image and the second scout scan image to generate a final scout scan image of the object.

22. The combined x-ray and SPECT imaging system of claim 21, wherein the imaging system is adapted to generate the final scout scan image of the imaged object based on portions of intersection between the first scout scan image and the second scout scan image.

23. The combined x-ray and SPECT imaging system of claim 3, wherein the imaging system is adapted to generate the final scout scan image of the imaged object by averaging overlapping values of the first scout scan image and the second scout scan image.

24. The combined x-ray and SPECT imaging system of claim 20, wherein the imaging system is adapted to gather the first imaging data in a first imaging acquisition that is an approximately 360 degree rotation of the detector, wherein the imaging system is adapted to gather the second imaging data in a second imaging acquisition that is an approximately 360 rotation of the detector, wherein the imaging system is adapted to combine the first imaging data with the second imaging data to generate a combined acquisition data set; and wherein the imaging system is adapted to reconstruct the combined acquisition data set to generate a reconstructed image of the object.

25. The combined x-ray and SPECT imaging system of claim 20, wherein the imaging system is adapted to gather the first imaging data in a first imaging acquisition that is a short scan acquisition; wherein the imaging system is adapted to gather the second imaging data in a second imaging acquisition that is a short scan acquisition; wherein the imaging system is adapted to combine the first imaging data with the second imaging data to generate a combined acquisition data set; and wherein the imaging system is adapted to reconstruct the combined acquisition data set to generate a reconstructed image of the object.

26. A method of generating an image of an object using an imaging apparatus having a detector, comprising the steps of:
   gathering a first imaging data regarding the object with the detector offset from a center of rotation in a first offset position, wherein the detector spans approximately a first half of the width of the object in the first offset position;
   shifting the detector to a second position which is offset from the center of rotation, wherein the second offset position is different from the first offset position, during an imaging acquisition such that the detector is in the second offset position at the conclusion of the imaging acquisition;

gathering a second imaging data regarding the object with the detector in the second offset position, wherein the second offset position spans generally a remaining half of the width of the object that was not spanned by the detector in the first offset position;

gathering third imaging data regarding the object during the imaging acquisition with the detector in a plurality of intermediate positions between the first offset position and the second offset position; and reconstructing the first, second and third imaging data to generate a reconstructed image of the object.

27. The method of claim 26, wherein the detector rotates approximately 180 degrees during the imaging acquisition.

28. The method of claim 26, further comprising customizing a location of a region of interest within the object by varying at least one of a start angle and an end angle of the imaging acquisition.

29. The method of claim 26, wherein the detector is continuously shifted during the imaging acquisition.

30. A medical imaging apparatus adapted to generate an image of an object, comprising:
   a radiation source;
   a detector which detects radiation emitted by the source;
   wherein the medical imaging apparatus is adapted to gather a first imaging data regarding the object with the detector offset from a center of rotation in a first offset position, wherein the detector spans approximately a first half of the width of the object in the first offset position;
   wherein the medical imaging apparatus is adapted to shift the detector to a second position which is offset from the center of rotation, wherein the second offset position is different from the first offset position, during an imaging acquisition such that the detector is in the second offset position at the conclusion of the imaging acquisition;
   wherein the medical imaging apparatus is adapted to gather a second imaging data regarding the object with the detector in the second offset position, wherein the second offset position spans generally a remaining half of the width of the object that was not spanned by the detector in the first offset position;
   wherein the medical imaging apparatus is adapted to gather third imaging data regarding the object during the imaging acquisition with the detector in a plurality of intermediate positions between the first offset position and the second offset position; and
   wherein the medical imaging apparatus is adapted to reconstruct the first, second and third imaging data to generate a reconstructed image of the object.

31. The apparatus of claim 30, wherein the detector rotates approximately 180 degrees during the imaging acquisition.

32. The apparatus of claim 30, wherein the apparatus is adapted to customize a location of a region of interest within the object by varying at least one of a start angle and an end angle of the imaging acquisition.

33. The apparatus of claim 30, wherein the detector is continuously shifted during the performance of the imaging acquisitions.

* * * * *